US012779337B2

(12) United States Patent
Bean

(10) Patent No.: US 12,779,337 B2
(45) Date of Patent: Nov. 3, 2026

(54) SYSTEMS AND METHODS FOR NONPLAYER CHARACTER (NPC) PERSONALIZATION AND ELECTRONIC GAME CONTROL

(71) Applicant: Sony Interactive Entertainment Inc., Tokyo (JP)

(72) Inventor: Celeste Bean, San Francisco, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 330 days.

(21) Appl. No.: 18/416,288

(22) Filed: Jan. 18, 2024

(65) Prior Publication Data

US 2025/0235789 A1 Jul. 24, 2025

(51) Int. Cl.
*A63F 13/63* (2014.01)
*A63F 13/56* (2014.01)
(Continued)

(52) U.S. Cl.
CPC .............. *A63F 13/63* (2014.09); *A63F 13/56* (2014.09); *A63F 13/67* (2014.09); *A63F 13/79* (2014.09)

(58) Field of Classification Search
CPC ...... A63F 13/87; A63F 13/424; A63F 13/215; A63F 13/79; A63F 13/67; A63F 13/56; A63F 13/63
(Continued)

(56) References Cited

U.S. PATENT DOCUMENTS 11,663,182 B2 5/2023 Emma et al.
2004/0266506 A1* 12/2004 Herbrich ................ A63F 13/30 463/6
(Continued)

FOREIGN PATENT DOCUMENTS

CN 117271749 A 12/2023
WO WO-2019113502 A2 * 6/2019 ............ G06N 3/045
WO 2023229755 A1 11/2023

OTHER PUBLICATIONS

Smith, Sam; "Driving With Mario Andretti, Who at 76, Still Refuses to Slow Down", Jun. 24, 2016, https://www.roadandtrack.com/motorsports/a29603/driving-with-mario-andretti/ (Year: 2016).*
(Continued)

*Primary Examiner* — Michael A Cuff
(74) *Attorney, Agent, or Firm* — Kilpatrick Townsend & Stockton LLP

(57) ABSTRACT

System, process, and device configurations are provided for nonplayer character (NPC) personalization and electronic game control. Methods can include receiving user input to personalize at least one nonplayer character (NPC) of an electronic game, generating at least one NPC seed element for the at least one NPC character, and controlling output of the electronic game with at least one NPC character presented including an NPC seed element. NPC seed elements may be determined from one or more of communication steams including messaging data, game chat and voice communications. In addition, systems and methods include training a machine learning model for generatively producing NPC communications, NPC interactions, and NPC appearance. Operations also allow for detecting electronic game data to identify NPC messaging for a game including modification of a communication style NPC character while maintain NPC game messaging.

20 Claims, 4 Drawing Sheets

(51) Int. Cl.
*A63F 13/67* (2014.01)
*A63F 13/79* (2014.01)

(58) Field of Classification Search
USPC .......................................................... 463/31
See application file for complete search history.

(56) References Cited

U.S. PATENT DOCUMENTS

| | | | | |
|---|---|---|---|---|
| 2007/0054717 | A1* | 3/2007 | Youm ..................... | A63F 13/30<br>463/1 |
| 2007/0218987 | A1* | 9/2007 | Van Luchene .......... | A63F 13/45<br>463/30 |
| 2008/0207330 | A1* | 8/2008 | Beale ..................... | G06N 3/004<br>463/42 |
| 2012/0290950 | A1* | 11/2012 | Rapaport ............ | H04L 12/1818<br>715/753 |
| 2015/0111641 | A1* | 4/2015 | Timm ..................... | A63F 13/55<br>463/31 |
| 2016/0166939 | A9 | 6/2016 | Chudley et al. | |
| 2019/0272325 | A1* | 9/2019 | Korn ....................... | G10L 13/08 |
| 2020/0074805 | A1* | 3/2020 | Selegue .............. | G07F 17/3267 |
| 2020/0111298 | A1* | 4/2020 | Crispino ............. | G07F 17/3213 |
| 2020/0197811 | A1 | 6/2020 | Eatedali et al. | |
| 2021/0011976 | A1* | 1/2021 | Brake ................... | G06F 40/242 |
| 2021/0312042 | A1* | 10/2021 | Ben-David ......... | G06F 16/9566 |
| 2021/0400142 | A1* | 12/2021 | Jorasch ............... | H04L 65/1069 |
| 2023/0381665 | A1* | 11/2023 | Dolan ..................... | A63F 13/58 |

OTHER PUBLICATIONS

PCT/US2025/011818, "International Search Report and Written Opinion", May 13, 2025, 10 pages.

* cited by examiner

SYSTEMS AND METHODS FOR NONPLAYER CHARACTER (NPC) PERSONALIZATION AND ELECTRONIC GAME CONTROL

FIELD

The present disclosure is directed to systems and methods for dynamic chat translation and interactive entertainment control, including machine model language translation, electronic game control, game content rendering, gaming device operations, and gaming device processes.

BACKGROUND

Computer and console games titles have been developed in many styles for different gaming systems and platforms. As device processing increases and game play environments become more immersive, there is a desire for enhancement of content and customization of content for a user. Conventional games allow for preprogrammed settings, however, these settings may not be suitable for all users. In addition, preprogrammed settings may be based on a fixed set of parameters and may have a limited ability to personalize content. There is a need and a desire to provide customization for a user that is based on user input. There also exists a desire to accommodate users in different locations and with different communication styles.

BRIEF SUMMARY OF THE EMBODIMENTS

Disclosed and described herein are systems, methods and device configurations for nonplayer character (NPC) personalization and electronic game control. In one embodiment, a method includes receiving, by a device, a user input to personalize at least one nonplayer character (NPC) of an electronic game, and generating, by the device, at least one NPC seed element for the at least one NPC character. The method also includes controlling, by the device, output of the electronic game, wherein the at least one NPC character is presented including the at least one NPC seed element.

In one embodiment, receiving the user input includes receiving an identification of a NPC seed element source.

In one embodiment, generating the at least one NPC seed includes detecting at least one of audio, text, and image data on a user device.

In one embodiment, generating the at least one NPC seed includes controlling a machine learning model to identify at least one of voice communication content and message communication content of an NPC seed source.

In one embodiment, generating the at least one NPC seed includes filtering personal data of an NPC seed source.

In one embodiment, controlling output of the electronic game includes controlling at least one of an NPC action and an NPC appearance in the electronic game.

In one embodiment, controlling output of the electronic game includes controlling an NPC output communication with at least one detected communication phrase of an NPC seed source.

In one embodiment, controlling output of the electronic game includes controlling the NPC character to output a humorous communication.

In one embodiment, controlling output of the electronic game includes modifying a communication style of the NPC character and including an NPC game instruction message.

In one embodiment, the method includes receiving game data identifying NPC communications for the electronic game, and wherein generating the at least one NPC seed element for the at least one NPC character includes modifying at least one received NPC communication for the electronic game.

Another embodiment is directed to a device configured for nonplayer character (NPC) personalization and electronic game control. The device includes an interface configured to output gaming content, a memory storing executable instructions and a controller, coupled to the interface and memory. The controller is configured to receive a user input to personalize at least one nonplayer character (NPC) of an electronic game, and generate at least one NPC seed element for the at least one NPC character. The controller is also configured to control output of the electronic game, wherein the at least one NPC character is presented including the at least one NPC seed element.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

Figure 1:
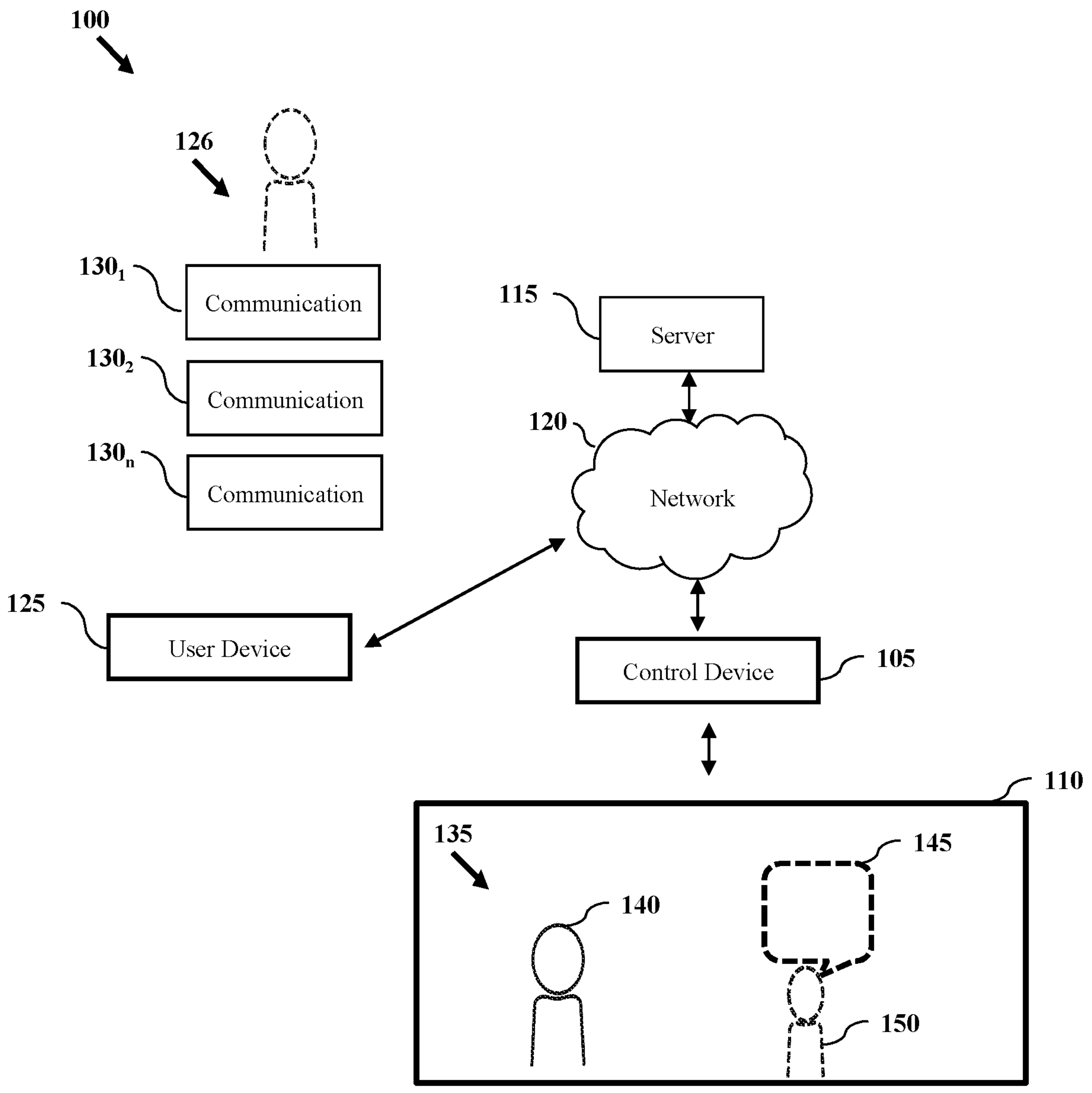
FIG. 1 is a graphical representation of nonplayer character (NPC) personalization and electronic game control according to one or more embodiments.

One aspect of the disclosure is directed to nonplayer character (NPC) personalization for electronic devices and electronic games, including gaming consoles, network games and network based applications for interactive and entertainment devices. Nonplayer character (NPC) personalization, which also may be referred to as non-player character personalization, may include modification of at least one of text, audio, appearance and characteristics in general of one or more NPCs in an electronic game. NPCs, and described herein also as NPC characters, provide useful information to players in games. NPCs can provide instructions, such as directions, to advance within a game. In other games, NPCs may interact with a player, or player controlled character or game element, in one or more stages of the game. According to embodiments, operations are provided to identify features for personalization of NPCs. According to embodiments, one or more seed elements may be determined to personalize an NPC of one or more games. According to another embodiments, seed elements may be based on a real person and/or user input, to create an NPC with at least one of mannerisms and personalities of a friend, show/movie/video character. Personalization may be provided based on people of interest, such as a favorite professor, comedian, celebrity, etc. By personalizing an NPC based on user input, the user may customize one or more aspects of a NPC to improve a gaming experience. In addition, customization based on user input does not require preprogramming of all individuals. Rather, personalization may be used to modify one or more existing NPCs and/or create an NPC for an electronic game.

Embodiments are directed to systems, processes, and device configurations for nonplayer character (NPC) personalization and electronic game control. Methods can include receiving user input to personalize at least one nonplayer character (NPC) of an electronic game, generating at least one NPC seed element for the at least one NPC character, and controlling output of the electronic game with at least one NPC character presented including an NPC seed element. NPC seed elements may be determined from one or more of communication streams including messaging data, in-game chat and voice communications. In addition, systems and methods include training a machine learning model for generatively producing NPC communications, NPC interactions, and NPC appearance. Operations also allow for detecting electronic game data to identify NPC output (e.g., messaging) for a game including modification of a communication style of NPC characters while maintaining NPC game messaging.

Embodiments are directed to gaming systems which may include consoles, processors or servers that generate game media and interactive entertainment devices configured to provide output and receive user input. Personalization of NPCs can be applied to applications associated with gaming systems, including game engine processes for output of gaming content and game communication functions. Embodiments may also be applied to one or more game functions, such as character dialogue and NPC control within a game engine. A user, as used herein, may relate to a user of a gaming system, such as a console configured to control or operate one or more of a game element, game character and game world. The user may interact with one or more game NPCs while playing the game.

Embodiments are also directed to generating an NPC seed bank. Personalization of NPC elements in an electronic game may include identifying user data and detecting seed elements. According to embodiments, users may acknowledge and agree to use of user communications, such as messaging, voice communication messages and use of user data to identify characteristics of one or more seed users. Using detected data, personal information of seed users may be removed and one or more NPC seeds may be generated. According to embodiments, communications may be received for a first user of an electronic game from a seed user, including one or more of voice, text and audio data. The communications may be received on a user device, which may be a personal communication device (e.g., phone, tablet, etc.). Using a machine learning model for language processing, one or more seed elements may be detected for the seed user. Generating NPC seeds may include generating one or more of scripts, responses, and/or humor. NPC seeds may be based on a seed user or for generating NPC content in general. In addition, NPC seeds may be generated consistent with one or more game functions and game scripts. Embodiments include one or more operations and device configurations for using and updating machine learning models. Processes may use machine learning models including communication databases for audio, graphical, text and language models to detect and convert communications.

As used herein, the terms “a” or “an” shall mean one or more than one. The term “plurality” shall mean two or more than two. The term “another” is defined as a second or more. The terms “including” and/or “having” are open ended (e.g., comprising). The term “or” as used herein is to be interpreted as inclusive or meaning any one or any combination. Therefore, “A, B or C” means “any of the following: A; B; C; A and B; A and C; B and C; A, B and C”. An exception to this definition will occur only when a combination of elements, functions, steps or acts are in some way inherently mutually exclusive.

Reference throughout this document to “one embodiment,” “certain embodiments,” “an embodiment,” or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

EXEMPLARY EMBODIMENTS

FIG. 1 is a graphical representation of nonplayer character (NPC) personalization and electronic game control according to one or more embodiments. According to embodiments, one or more devices of system 100 may be configured for NPC personalization. System 100 includes control device 105 which may be configured to control electronic game presentation, including personalization of at least one NPC character to display 110. According to embodiments, one or more operations may be performed by a network device, such as server 115, for personalization an electronic game control. Network 120 may support communication relative to one or more of control device 105, display 110, server 115 and one or more devices, such as user device 125.

According to embodiments, control device 105 may be configured to control presentation of electronic game content on display 110. When gaming content is a network game, server 115 may be configured to control gaming content output for a user. According to embodiments, operations for presentation of game content and personalization performed by control device 105 may similarly be performed by server 115. Personalization may be performed by a device, control device 105 and/or server 115, controlling presentation of game content. According to other embodiments, control device 105 and server 115 may interoperate with each other to perform operations described herein.

According to embodiments, a user of a game, such as a game player may want to personalize one or more NPCs of the game. Control device 105 may be configured to receive a user input to personalize at least one nonplayer character (NPC) of an electronic game. Personalization may be based on the user input provided, which may include one or more instructions or inputs for personalization. According to embodiments, personalization may be based on communications of a game player with one or more other individuals or contacts, such as a seed user. According to other embodiments, personalization may be based on voice or image data. Personalization may be based on graphics or memes (e.g., graphical elements, text elements, video elements, etc.).

Embodiments can detect one or more inputs as seeds for personalization and/or detect seeds for personalization of an NPC from elements of a user input. Seed elements as used herein may allow for personalizing one or more NPCs based on a real person, such as a contact, friend, favorite professor, favorite comedian, or celebrity. Similarly, seed elements may allow for personalizing one or more NPCs based on characters, such as movie or show character. As an example, when communications with a contact or seed user include a recurring joke, phrase and/or one or more memes, seed elements may be based on the content of the communications and this content may be used to personalize features of an NPC. By detecting seed elements, one or more mannerisms and personality parameters may be detected and used for personalization of an NPC.

Control device 105 may be configured to receive a user input to personalize one or more NPC characters of an electronic game and present game content to include a personalized NPC character. A personalized NPC character may include elements of a game NPC with one or more features modified. According to embodiments, a user input to personalize an NPC may include at least one of identification of an NPC to by modified, identification of a seed element, identification of a seed user and an instruction in general. User input may be provide by way of a game controller for control device 105, by using a user device 125 and by way of commands to control device such as menu selections, voice commands and game commands in general.

According to embodiments, personalization of an NPC may be based on one or more communications of a user with another user. By way of example, a game player of control device 105 may have one or more communications with another individual, the communications may include one or more of text, messaging, graphical elements and voice communications. According to embodiments, one or more conversations may be detected form a device associated with the game player, such as user device 125. User device 125 may be a personal device, such as a mobile phone, personal communication device and tablet. FIG. 1 illustrates communications $\mathbf{130}_{1\text{-}n}$ which may be detected by user device 125 and/or shared by user device 125 with control device 105. Communications $\mathbf{130}_{1\text{-}n}$ may relate to one or more of voice and text data exchange by and/or received by a user. As such, communications $\mathbf{130}_{1\text{-}n}$ may relate to personal interaction data which may be used to train a machine learning model and/or for personalization of NPCs. When a user input includes identification of a user contact on a user communication device, user device 125 may share one or more communications with control device and/or server 115 to determine one or more seed elements for personalizing an NPC. Control device 105 may be configured to scrub personal information from communications $\mathbf{130}_{1\text{-}n}$. Communications $\mathbf{130}_{1\text{-}n}$ may be associated with a contact, such as seed contact 126, identified by a user. Seed contact 126 may be a known person. In some embodiments, seed contact 126 may represent an identified character or source of communication data. FIG. 1 illustrates a plurality of communications $\mathbf{130}_{1\text{-}n}$ which may be communicated by way of network 120 to at least one of control device 105 and server 115 with user permission. According to embodiments, communications $\mathbf{130}_{1\text{-}n}$ may be one or more communications selected by a user and marked as seed elements for personalization of an NPC. According to yet another embodiment, communications $\mathbf{130}_{1\text{-}n}$ may be one or more communications during a game chat or game communication function. According to embodiments, control device 105 and server 115 may operate independently or jointly to receive and/or process communications $\mathbf{130}_{1\text{-}n}$.

According to embodiments, personalization of an NPC may be based on one or more mannerisms, personality parameters and appearance of graphical elements and/or identified persons. A user input identifying a movie character, for example, may result in at least one seed element for each of an appearance, hair style, body style, face type, and appearance parameter in general. It should be appreciated that seed elements may be determined from a variety of different sources. When a user input indicates using a personal contact, such as a favorite professor, seed elements for personalization of the NPC may be based on one or more of communications, appearance and common phrases uttered by the personal contact.

Based on a user input identifying at least one of a person, source of seed elements, control device 105 may be configured to generate at least one NPC seed element for the at least one NPC character. Using the NPC seed element, control device 105 may control output of an electronic game, wherein the at least one NPC character is presented including the at least one NPC seed element.

According to embodiments, a user may link or provide data from a user device 125 to provide data for one or more seed elements. It should be appreciated that control device 105 and/or server 115 may provide a user interface for receiving user input including one or more of an application interface, online browsing and network interface in general. According to embodiments, functions of user device 125 described herein may be performed by control device 105.

Display 110 in FIG. illustrates an example of game content 135. According to embodiments, game engine operations may be performed by control device 105 to allow players to engage with an NPC. A player controlled element of a game, such as a character, may engage with an NPC when in close proximity. The game may use NPCs to provide information, such as instructions. Game content 135 includes a user character 140. According to embodiments, control device 105 may control presentation of NPC dialogue 145 personalized for game NPC 150. According to embodiments, control device 105 may control presentation appearance of game NPC 150. Appearance may be personalized to include one or more of a mannerism, personality trait and appearance trait. Seed elements may be detected for one or more of an appearance item, hair color, hair style, and eye color. Mannerisms may include body movement, physical gestures, facial expressions, and body movements in general.

According to embodiments personalization of an NPC character in an electronic game may be based on an archetype or character trait (e.g., spicy bartender, professor, etc.) received in a user input. According to embodiments, control device 105 may generate NPC dialogue based on the character and/or character trait to include at least one of a script and communication style based on the character and/or character trait. Control device 105 may use a machine learning model to generate a script for a character and/or character trait. Generation of character scripts may be based on predetermined reactions of an NPC character based on game data, included NPC comments and sample conversations.

One or more devices of system 100 may perform operations of process 200 described with reference to FIG. 2. According to embodiments, operations may be performed for an electronic game, or media in general, output by display 110. When communications $\mathbf{130}_{1\text{-}n}$ relate to speech, such as voice of one or more persons, seed elements may be determined for conversion of NPC speech. Conversion of NPC speech may include modification of an NPC voicing based on one or more of input audio, seed data and voice analysis. Similarly, control device 105 may provide text and/or graphical output to display device 110 for output. When communications are text, such as part of a game chat or communications in general, NPC text and audio may be personalized based on the text style.

According to embodiments, generating at least one seed element and controlling output of an electronic game may be performed using a machine learning language model. Processes for conversion are discussed with reference to FIGS. 2 and 4. According to embodiments, system 100 may be configured to use and update machine learning models. One or more devices of system 100 may monitor communications, such as communications $\mathbf{130}_{1\text{-}n}$, and user input to provide as input to a machine learning model performed by one or more of control device 105, and server 115.

According to embodiments, personalization of an NPC may include modifying at least one of a communication format and appearance of an NPC. In-game NPCs may provide instructions that are necessary for gameplay. Controlling output of the electronic game may include modifying the style of an NPC message while maintaining the information to be provided to a user. According to embodiments, personalization of an NPC by system 100 may be performed using a machine learning model. One or more devices of system 100, such as control device 105, server 115 and display 110 may perform operations of a machine learning model.

System 100 may provide features to improve user experience, wherein functions and operations described herein are performed following user consent, with express notice to a user, and/or in alignment with one or more user settings for user privacy. It should be appreciated that embodiments may be applied to interactive entertainment with one or more users. Processes described herein are not limited to gaming content.

Figure 2A:
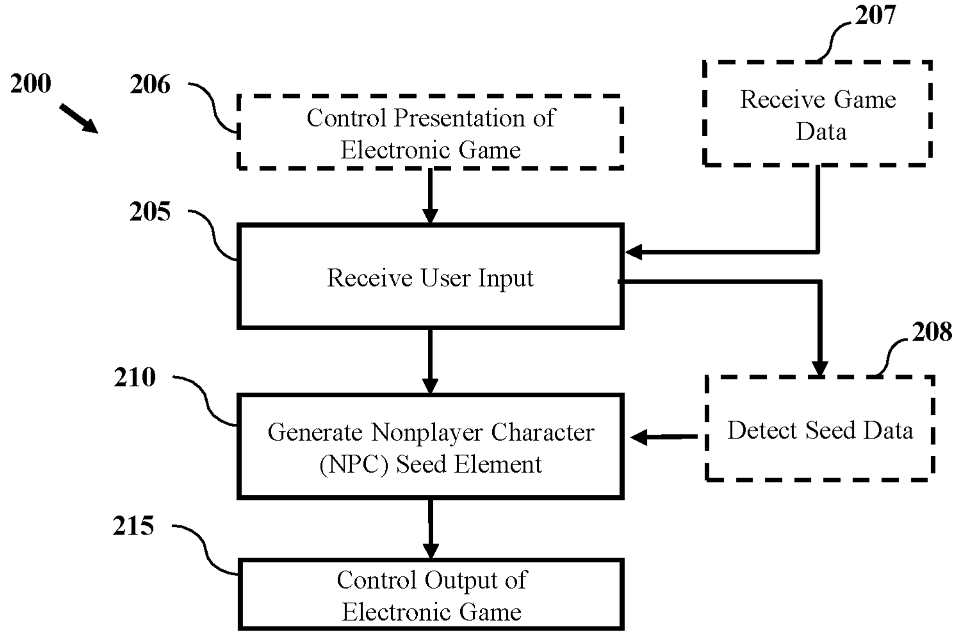
FIG. 2A illustrates a process for nonplayer character (NPC) personalization and electronic game control according to one or more embodiments.

FIG. 2A illustrates a process for of nonplayer character (NPC) personalization and electronic game control according to one or more embodiments. Process 200 may modify and/or personalize one or more NPC characters of an electronic game. Process 200 may be performed by a device, such as control device 105 of FIG. 1 and/or device 300 and/or controller 310 of FIG. 3, for at least one of NPC personalization and electronic game control. Process 200 may be initiated by a device (e.g., control device 105, server 115, device 305, etc.) receiving a user input to personalize at least one nonplayer character (NPC) of an electronic game at block 205. According to embodiments, receiving user input includes receiving an identification of a NPC seed element source. The NPC seed element source may be an identification of a person, such as a contact in a user's device, a name and/one or more network identifications (e.g., user handle, user name, etc.). The NPC seed element source may be identification of data, such as one or more of communications, audio information, video data and text. Receiving a communication at block 205 may include receiving an identification of a seed user (e.g., contact name, profile name, social media handle, name, etc.) associated with one or more communications stored on a device of a user (e.g., user device 126).

Process 200 may also optionally include controlling presentation of an electronic game at optional block 206. Process 200 may be performed on electronic games (e.g., video games, interactive games, etc.). Electronic games may include one or more player controlled elements, a visual display, or one or more levels or areas, and the ability of the user to control a game element or character relative to one or more levels and areas. Electronic games may also include non-player elements such as non-player characters and various game elements and characters. Games may include a storyline including character information, such as a character backstory and one or more narrative components describing and/or associated with gameplay. Controlling presentation of an electronic game at block 206 may include controlling presentation and interaction with one or more NPC characters.

Process 200 may also optionally include receiving game data at optional block 207. The game data may include an identification of NPC characters in the electronic game and one or more parameters related to presentation of the characters. In some instances, a user selects a NPC character to be modified as part of presentation of electronic game data and using received game data at block 207. Receiving game data at block 207 may be used for identifying NPC communications for the electronic game. Generating at least one NPC seed element for the at least one NPC character may include modifying at least one received NPC communication for the electronic game.

At block 210, process 200 includes generating at least one NPC seed element for at least one NPC character. According to embodiments, user input received at block 205 including an identification of a person or source of data may be used to generate one or more NPC seeds. NPC seeds directed to appearance may be used to modify the appearance of an NPC character. NPC seeds directed to communication style may be used to modify the communication style of an NPC. According to embodiments, generating the at least one NPC seed includes detecting at least one of audio, text, and image data on a user device. Text conversations between a user (e.g., player) and the identified seed user or seed source may include one or more of text messages, interviews, emails, etc. Text conversations can capture non-text data including memes sent on one or more network services as an approximation of humor. Audio data may be sourced from one or more of phone calls, voice notes, podcasts, etc. Video data may be sourced from one or more of recorded video calls, interviews, video clips, and downloaded video data. NPC seeds may be generated consistent with one or more game functions and game scripts. For example, a game limitation on NPC ability may limit the implementation of generation of content based on an NPC seed.

Generating the at least one NPC seed at block 210 can include controlling a machine learning model to identify at least one of voice communication content and message communication content of an NPC seed source. By way of example, a machine learning model, such as a standard large language model, may feed an NPC for generatively produced interactions. The machine learning model may additionally be trained on data to customize at least one of personality, speech patterns, and tendencies of a real person. According to embodiments, machine learning models may use one or more conversation models based on conversation, salutations, greetings and personal conversations. Humor models may include parameters to impart humor to one or more communications.

Generating the at least one NPC seed at block 210 can include filtering personal data of an NPC seed source. According to embodiments, input data may be scrubbed or cleaned of any personally identifying information. Scrubbing may be performed on communications, for example, to remove any contact information. According to embodiments, user input including NPC seed material may remove personal information prior to using seed data in training and NPC generation.

According to embodiments, generating nonplayer character (NPC) seed elements at block 210 includes generating example communication exchanges based on a seed source. For example, if the seed source uses phraseology as a greeting, a seed element may be generated for a greeting based on or similar to communications used by the seed source. Additional communication styles and phrases may be detected an encoded as seed elements to be used for personalizing an NPC character.

At block 215, process 200 includes controlling output of the electronic game at block 215 to present at least one NPC character including at least one NPC seed element. Output of the NPC character may be in the form of at least one of voice, audio and text of the communication. According to embodiments, output of the NPC may include outputting control information to an electronic game to control game elements, such as output of an NPC. Output of the NPC may be an update compared to standard output of the NPC.

According to embodiments, controlling output of the electronic game at block 215 includes controlling at least one of an NPC action and an NPC appearance in the electronic game. At least one of a communication style, appearance and mannerism may be imparted to the NPC character. By way of example, if a user input requests for communication style to be associated with a particular person or character, the NPC may be personally qualified on a number of characteristics of reactivity. NPC actions may include abilities or restrictions within the game and movements or the in-game NPC character (e.g., facial expression, arm/leg movements, dancing, body position, etc.).

Controlling output of the electronic game at block 215 may include modifying a communication style of the NPC character and including an NPC game instruction message. According to embodiments, controlling output of the electronic game at block 215 includes controlling an NPC output communication with at least one detected communication phrase of an NPC seed source. By way of example, if a user input requests for communication style to be associated with one or more communication messages and/or a seed user, the NPC character may include one or more phrases, terms and speech patterns based on at least one generated NPC seed element. Output of the NPC may be controlled to include at least one of scripts, responses, and humor consistent with the text conversations used as input data. Control of the NPC character may be control of speech synthesis based on audio clips available from video, calls, and/or voice notes. Control of the NPC character may include physical mannerisms based on video and/or graphic data. According to embodiments, controlling output of the electronic game at block 215 includes controlling the NPC character to output a humorous communication.

Process 200 may optionally include detecting seed data at optional block 208. According to embodiments, process 200 may detect seed data from one or more seed users and/or data sources at block 208. Seed data may be detected to determine one or more modifications to an existing NPC character. According to embodiments, seed data detected at block 208 may be based on game data received at block 207. In a game with particular characteristics for NPC characters, seed data may need to be detected at block 208 to fulfill a user input at block 205.

Seed data may provide one or more of a text, audio, communications and voicings that may be used to modify existing output of an NPC and/or to generate new output. Seed data may include portions or elements of NPC output or appearance. For example, seed data my describe a hair style and/or hair color. Seed data may include responses to questions, conversation scripts and/or selected phrases or terms that may be used to personalize a NPC character.

Figure 2B:
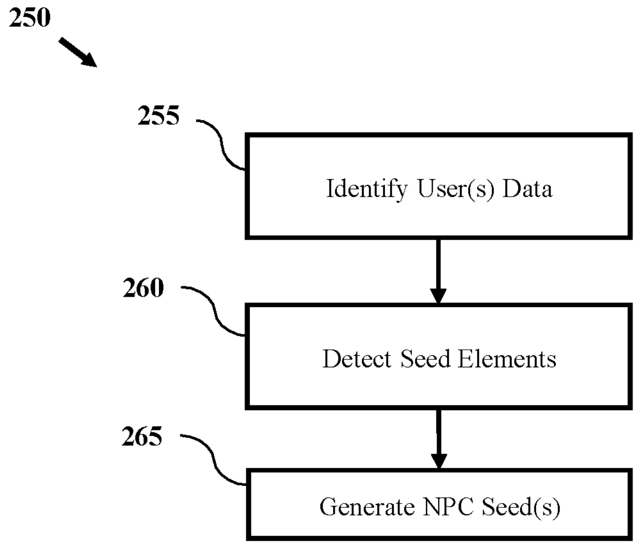
FIG. 2B illustrates a process for generating nonplayer character (NPC) seeds for personalization and electronic game control according to one or more embodiments.

FIG. 2B illustrates a process for generating nonplayer character (NPC) seeds for personalization and electronic game control according to one or more embodiments. Process 250 may generate one or more NPC seeds for personalization of an NPC character of an electronic game. Process 250 may be performed by a device, such as control device 105 of FIG. 1 and/or device 300 and/or controller 310 of FIG. 3. According to embodiments, process 250 may be performed to identify parameters which may be used for personalization of one or more NPC characters. Process 250 may be initiated by a device (e.g., control device 105, server 115, device 305, etc.) identifying user data at block 255. According to embodiments, identification of user data may include processing one or more data sources for communications data on a user device and/or network location storing user data. When communications include messaging application data, the messaging flow for one or more users in the messaging application may be identified as user data. By viewing content in a messaging window, communication style and preferences of one or more users may be detected. In embodiments, a user may provide data or highlight one or more communications as being indicative of a style desired for a NPC character. Identification of user data in block 255 is based on user permission and with user authorization.

At block 260, process 250 includes detecting seed elements based on user data identified at block 255. Using data identified at block 255, process 250 may detect one or more of text, audio, video and graphical content. By way of example, seed elements may be detected for a communication style, including word selection, salutations and greetings, and frequently used terms or phrases. Seed elements may be detected for elements a user finds humorous. By way of example, a running joke or repeated text content may be identified as including humorous content. Similarly, content may be responded to and labeled as being funny or humorous. Seed elements may be detected for an appearance of an individual. For example, detection of hair color or body movement styles may be detected. For a seed element detected identifying a particular body movement, such as a head lean for example, an NPC can be configured to include body mechanics with a similar head tilt. Seed elements detected may be examples of content or characteristics of a seed user that may be used to generate one or more NPC seeds.

At block 265, process 250 includes generating at least one NPC seed. The NPC seed may be a characteristic or element that may be used for personalizing an NPC of electronic game content. To provide a robust experience, personalization of an NPC may be performed using a plurality of NPC seeds. An NPC seed may be a data unit that may be read and used by a processing device for electronic game data. According to embodiments, one NPC seeds may be generated to personalize at least one nonplayer character (NPC) of an electronic game at block 205.

Figure 3:
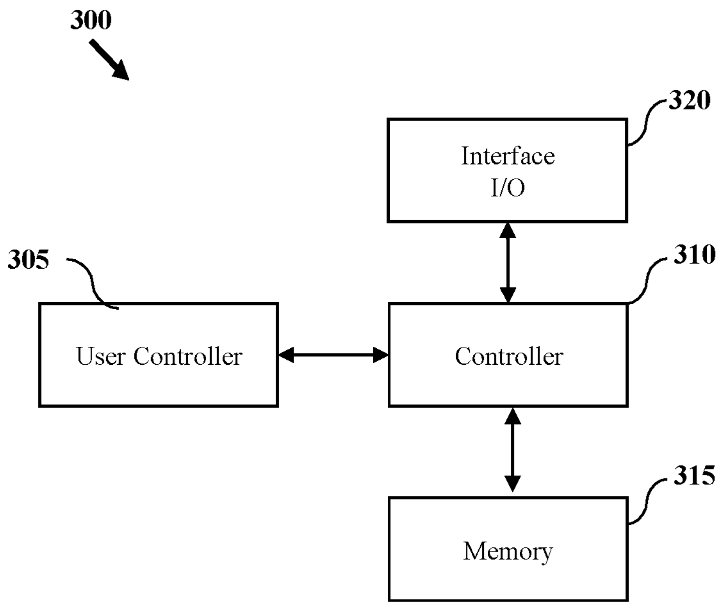
FIG. 3 illustrates a graphical representation of a device configuration according to one or more embodiments.

FIG. 3 illustrates a graphical representation of a device configuration according to one or more embodiments. Device 300 provides a configuration for a device configured for NPC personalization and electronic game control (e.g., control device 105) and may relate to a gaming console, media device, and/or handheld device. Device 300 may be configured to present and update gaming content using one or more NPC seed elements. According to embodiments, device 300 includes user controller 305, controller 310, and memory 315. Device 300 may also include an interface (e.g., network communication module, input/output (I/O) interface) 320. Device 300 may receive input from user controller (e.g., game controller) 305. Device 300 may output gaming content to a display using interface 320.

Controller 310 may relate to a processor or control device configured to execute one or more operations (e.g., executable instructions) stored in memory 315, such as processes for NPC personalization. Memory 315 may be non-transitory memory configured to provide data storage and working memory operations for device 300. Memory 315 may be configured to store computer readable instructions for execution by controller 310 for one or more processes described herein. Interface 320 may be a communications module configured to receive and transmit network communication data.

Device 300 may be configured to receive gaming media (e.g., card, cartridge, disk, etc.) and output visual and audio content of the gaming media to a display. For network games, device 300 may receive game data from a network source. Device 300 may be configured to receive input from one or more peripheral devices, such as user controller 305.

Controller 310 may be configured to control presentation of electronic gaming content, detect NPC seed elements and present gaming content. Controller 310 may also be configured to convert communications and control one or more machine learning model operations for language processing. Controller 310 may also be configured to output an updated gaming content including at least one personalized NPC.

Figure 4:
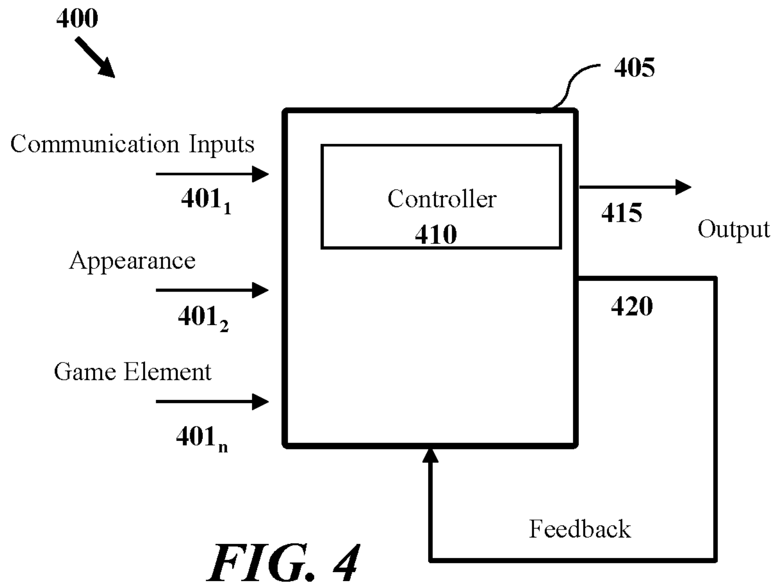
FIG. 4 illustrates a graphical representation of nonplayer character (NPC) personalization training according to one or more embodiments.

FIG. 4 illustrates a graphical representation of nonplayer character (NPC) personalization training according to one or more embodiments. According to embodiments, detection of seed elements and generating NPC seeds to personalize NPC characters may be determined using one or more references and models. Information for personalizing NPCs may be based on seed elements, which may include data providing a configuration for one or more of text, audio, video, graphical and appearance of an NPC. Seed elements may be detected from one or more user inputs and/or using a user input to identify one or more characteristics to personalize an NPC. By way of example, a user input including communication strings with a seed user may be input in order to detect seed elements from the communications. In this case, the seed elements may be one or more of text, phrases and a communication style of the seed user. By way of example, phrases the seed user uses that have been repeated, or statements identified as humorous may be used as seed elements to impart humor on an NPC character similar to the seed user. When a seed user is identified as a contact of a user, such as a contact on a mobile device or a social media handle, the seed elements may detect data from one or more network sites associated with the seed user including one or more of text, audio, video, images and user activity on the network site. Seed elements may be generated from minimal user inputs, such as memes. By way of example a meme may include one or more of text, graphics, video and image data, often of a celebrity or character in a show or media. When a meme is submitted, one or more characteristics of the meme may be imparted on an NPC character. For example, a facial expression of a character in a meme may be detected and used to control a facial expression of an NPC character for a period of time. Similarly, the appearance of a character may be used to control the appearance of an NPC character. Information and data for generating seed elements, including NPC appearance, NPC output (e.g., audio, video, graphical, etc.), NPC communication style and NPC mannerisms may be determined based on a training process of a machine learning model. In addition, a profile may be determined for a seed user or each input including one or more settings to apply to an NPC user. FIG. 4 illustrates training process 400 which can include receiving data $401_{1\text{-}n}$ as training input by a device 405 including a controller 410. According to embodiments, controller 410 may receive a plurality of communication inputs (text, audio, voice and user sounds, etc.) $401_1$. Controller 410 may receive appearance training data $401_2$ and game element training data $401_n$. In embodiments, appearance training data $401_2$ may include one or more training inputs for controlling appearance of an NPC character. By way of example, appearance training data $401_2$ may include non-NPC elements to control the visual appearance of an NPC, such as memes, images and graphics. Game element training data $401_n$ may include data for identifying features of NPC characters and game functionality for modifying an NPC character. Based on the training in process 400, controller 410 may generate output 415. Output 415 may include one or more seed elements that may be used to generate an NPC character. According to embodiments, controller 410 may be configured to generate output 415 based on a recursive loop including training and feedback. Feedback loop 420 may provide information such as ratings and accuracy for output 415.

According to embodiments, users acknowledge and agree to provide access to personal devices to provide data that may be used for training and/or to provide seed elements. By way of example, phone communications can be mined, with identified data scrubbed of personal or sensitive information. One or more users, or seed users, may be linked to mined data. Similarly, in-game communications may be mined to detect seed elements. Using mined data, such as phone images for appearance or user provided images, one or more seed elements may be determined by a control device for the appearance of an NPC. Communication characteristics may also be used to determine seed elements.

According to embodiments, training process 400 and controller 410 may be configured to use one or more machine learning models (e.g., artificial intelligence, iterative models, etc.) to identify communications and communication style. Training process 400 and controller 410 may use one or more libraries of common user responses. According to embodiments, output 415 may include output of communications with at least one modified segment.

Figure 5A:
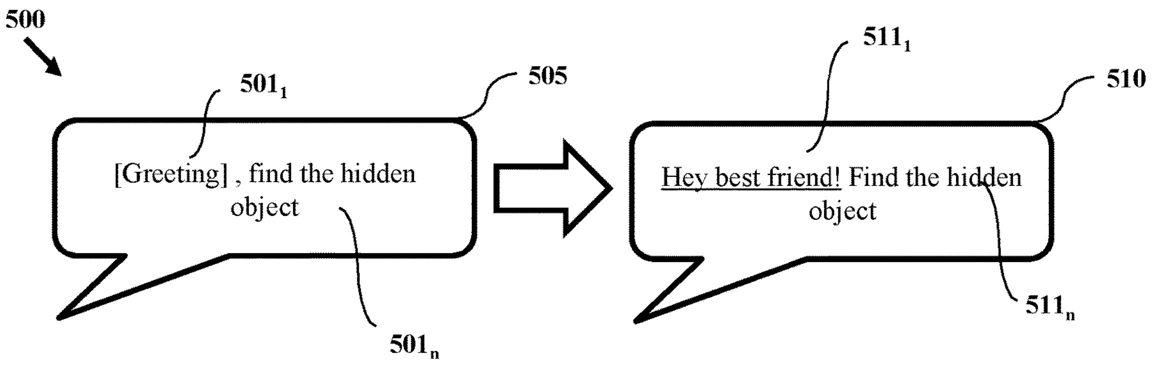
FIGS. 5A-5B are graphical representations of nonplayer character (NPC) personalization and electronic game control according to one or more embodiments.
Figure 5B:
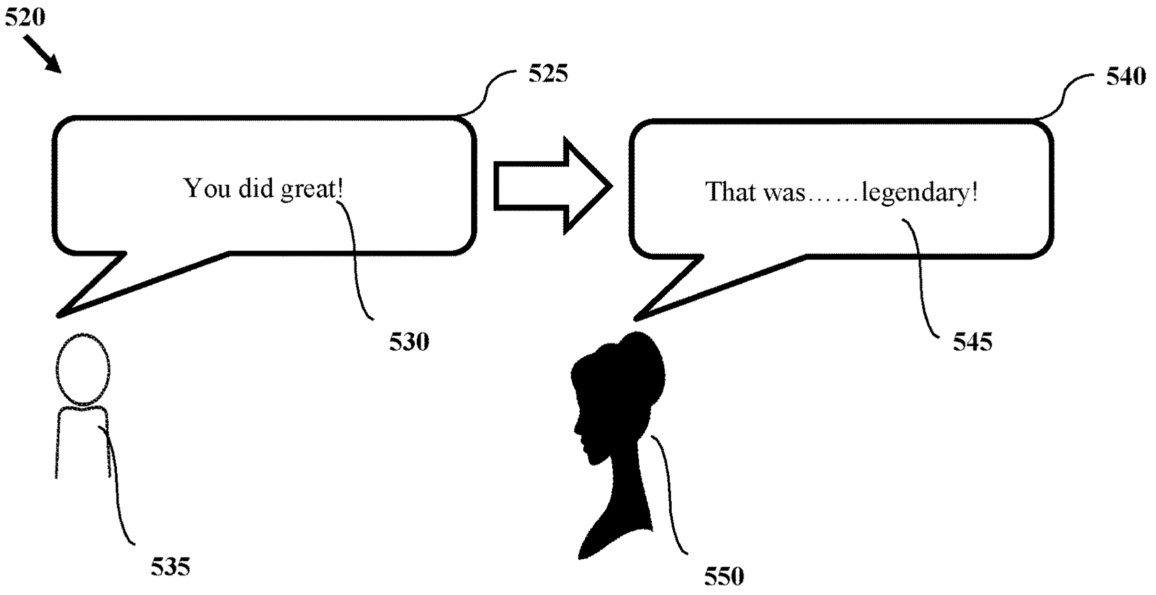

FIGS. 5A-5B are graphical representations of nonplayer character (NPC) personalization and electronic game control according to one or more embodiments. FIG. 5A illustrates personalization of an NPC character communication or message. Game developers may dedicate resources to a game storyline, including a backstory and game pathways. Accordingly, there is a desire to maintain game instructions and/or messaging. Personalization of an NPC character may include modifying and/or converting one or more game messages from an NPC character to a player. Converting can include replacing at least one segment of a game NPC communication segment with a replacement segment. According to embodiments, personalization of an NPC character may also include providing data or messages to include in an NPC character dialogue. By way of example, a game may include a message and at least one portion that can be personalized.

FIG. 5A illustrates process 500 including communication 505 which may be an in game message for an NPC character. According to embodiments, process 500 can include personalizing communication 505 to personalize at least one segment of the communication. Communication 505 includes communication segments $501_{1-n}$ including one or more elements that can be modified. According to embodiments, communication segments $501_{1-n}$ may be detected using a machine learning model for language processing and to identify one or more seed elements that may be used to personalize the communication. Communication segment $501_1$ includes a placeholder for providing a salutation and communication segment $501_n$ includes an in game instruction. According to embodiments, an exemplary personalization of communication 505 may include conversion to communication 510 by converting communication segments $501_{1-n}$ to communication segments $511_{1-n}$. Communication segment $511_1$ includes a statement and communication segment $511_n$ is updated based on the statement to correct and/or modify presentation format (e.g., capitalization). According to embodiments, personalization of communications can include modification and/or replacement of an entire message of an NPC character.

FIG. 5B illustrates process 520 including communication 525. According to embodiments, process 520 can include converting communication 525 to personalize and replace a communication. Process 520 also shows personalization of an appearance of an NPC character. Communication 525 includes communication segment 530, "You did great!" According to embodiments, communication segment 530 may be detected using at least one NPC seed element to convert the statement to be personalized based on user input. By way of example, a control device may receive a user input to personalize NPC character 535. A seed element may be generated based on the user input and communication 540 may be generated including communication segment 545, "That was . . . legendary!" Process 5230 may also personalize the appearance of NPC 535 to include one or more features associated with a seed user, such that NPC character 550 is presented. A machine learning model may be used for at least one of language processing and NPC personalization. According to embodiments, conversion of communication 525 to communication 540 may include inserting one or more of a seed users speech pattern or humor (e.g., jokes, memes, sayings, etc.). When a seed element is for an archetype or character trait (e.g., spicy bartender, professor, etc.), communication 540 may be converter based on the character/character trait to include at least one of a script and communication style based on the character/character trait.

While this disclosure has been particularly shown and described with references to exemplary embodiments thereof, it will be understood by those skilled in the art that various changes in form and details may be made therein without departing from the scope of the claimed embodiments.

What is claimed is:

1. A method comprising:

receiving, by a device during an electronic game session, a user input comprising communication data to personalize at least one nonplayer character (NPC) of an electronic game;

generating, by the device, at least one NPC seed element for the at least one NPC character from the communication data; and controlling, by the device, output of the electronic game during the electronic game session, wherein the at least one NPC character is presented including the at least one NPC seed element.

2. The method of claim 1, wherein receiving the user input includes receiving an identification of a NPC seed element source.

3. The method of claim 1, wherein generating the at least one NPC seed includes detecting at least one of user voice communications, in-game chat data, and image data on a user device.

4. The method of claim 1, wherein generating the at least one NPC seed includes controlling a machine learning model to identify at least one of voice communication content and message communication content of an NPC seed source.

5. The method of claim 1, wherein generating the at least one NPC seed includes filtering personal data of an NPC seed source.

6. The method of claim 1, wherein controlling output of the electronic game includes controlling at least one of an NPC action and an NPC appearance in the electronic game.

7. The method of claim 1, wherein controlling output of the electronic game includes controlling an NPC output communication with at least one detected communication phrase of an NPC seed source, the NPC output communication comprising a game instruction configured to provide information to advance within the electronic game, wherein controlling the NPC output communication comprises transforming the game instruction by replacing at least a portion of the game instruction with a replacement portion to modify a presentation of the game instruction.

8. The method of claim 1, wherein controlling output of the electronic game includes controlling the NPC character to output a humorous communication.

9. The method of claim 1, wherein controlling output of the electronic game includes modifying a communication style of the NPC character and including an NPC game instruction message.

10. The method of claim 1, further comprising receiving game data identifying NPC communications for the electronic game, and wherein generating the at least one NPC seed element for the at least one NPC character includes modifying at least one received NPC communication for the electronic game.

11. A device comprising:

an interface configured to output gaming content;

a memory storing executable instructions; and a controller coupled to the interface and the memory, wherein the controller is configured to:

receive, during an electronic gaming session, a user input comprising communication data to personalize at least one nonplayer character (NPC) of an electronic game;

generate at least one NPC seed element for the at least one NPC character from the communication data; and control output of the electronic game during the electronic game session, wherein the at least one NPC character is presented including the at least one NPC seed element.

12. The device of claim 11, wherein receiving the user input includes receiving an identification of a NPC seed element source.

13. The device of claim 11, wherein generating the at least one NPC seed includes detecting at least one of user voice communications, in-game chat data, and image data on a user device.

14. The device of claim 11, wherein generating the at least one NPC seed includes controlling a machine learning model to identify at least one of voice communication content and message communication content of an NPC seed source.

15. The device of claim 11, wherein generating the at least one NPC seed includes filtering personal data of an NPC seed source.

16. The device of claim 11, wherein controlling output of the electronic game includes controlling at least one of an NPC action and an NPC appearance in the electronic game.

17. The device of claim 11, wherein controlling output of the electronic game includes controlling an NPC output communication with at least one detected communication phrase of an NPC seed source, the NPC output communication comprising a game instruction configured to provide information to advance within the electronic game, wherein controlling the NPC output communication comprises transforming the game instruction by replacing at least a portion of the game instruction with a replacement portion to modify a presentation of the game instruction.

18. The device of claim 11, wherein controlling output of the electronic game includes modifying a communication style of the NPC character and including an NPC game instruction message.

19. The device of claim 11, wherein the controller is configured to receive game data identifying NPC communications for the electronic game, and wherein generating the at least one NPC seed element for the at least one NPC character includes modifying at least one received NPC communication for the electronic game.

20. A non-transitory computer-readable storage medium storing processor-executable instructions configured to cause one or more processors to:

receive, during an electronic gaming session, a user input comprising communication data to personalize at least one nonplayer character (NPC) of an electronic game, wherein the communication data comprises one or more of gaming session chat data, gaming session audio data, or gaming session image data;

generate at least one NPC seed element for the at least one NPC character from the communication data;

determine an NPC game instruction configured to provide information to advance within the electronic game; and control output of the electronic game during the electronic game session, wherein controlling output of the electronic game comprises modifying at least a portion of the NPC game instruction with a modification segment generated using the at least one NPC seed element.

* * * * *